US012110370B2

(12) United States Patent
Zia et al.

(10) Patent No.: US 12,110,370 B2
(45) Date of Patent: Oct. 8, 2024

(54) POLYESTER COMPOSITION AND ELASTOMER COATED ARTICLE MADE THEREWITH

(71) Applicant: Celanese International Corporation, Irving, TX (US)

(72) Inventors: Qamer Zia, Raunheim (DE); Kirsten Markgraf, Weinheim (DE); Dirk Zierer, Hattersheim (DE); Patrick Nickolay, Villmar (DE)

(73) Assignee: Celanese International Corporation, Irving, TX (US)

( * ) Notice: Subject to any disclaimer, the term of this patent is extended or adjusted under 35 U.S.C. 154(b) by 0 days.

(21) Appl. No.: 17/897,953

(22) Filed: Aug. 29, 2022

(65) Prior Publication Data

US 2023/0077194 A1 Mar. 9, 2023

Related U.S. Application Data

(60) Provisional application No. 63/238,296, filed on Aug. 30, 2021.

(51) Int. Cl.
  *C08J 5/04* (2006.01)
  *C08K 3/40* (2006.01)
  *C08K 7/14* (2006.01)
(52) U.S. Cl.
  CPC ............... *C08J 5/043* (2013.01); *C08K 3/40* (2013.01); *C08K 7/14* (2013.01); *C08J 2367/03* (2013.01)
(58) Field of Classification Search
  CPC ........................................................ C08J 5/043
  See application file for complete search history.

(56) References Cited

U.S. PATENT DOCUMENTS 4,351,758 A 9/1982 Lu et al.
5,679,733 A 10/1997 Malik et al.
(Continued)

FOREIGN PATENT DOCUMENTS

CN  102532823 B  7/2012
CN  102344673 B  9/2012
(Continued)

OTHER PUBLICATIONS

Pibiflex TPC Thermoplastic Copolyester Elastomer [online]. [Retrieved: Jan. 20, 2024. Retrieved from the internet: URL: https://s3.amazonaws.com/entecpolymers.com/v3/uploads/Celanese-Pibiflex-TPC-Overview-10.20.pdf.] (Year: 2020).*

(Continued)

*Primary Examiner* — Ling Siu Choi
*Assistant Examiner* — Andrea Wu
(74) *Attorney, Agent, or Firm* — Dority & Manning, P.A.

(57) ABSTRACT

A polyester polymer composition is disclosed containing reinforcing fibers and having improved adhesion to elastomeric materials while also being formulated for medical applications and/or food service applications. The polyester polymer composition can contain a blend of different polyester polymers and can be free of hindered phenolic antioxidants. The polyester polymer composition can be used in overmolding applications in which the composition is initially molded into a polymer component and then overmolded with an elastomeric material. The elastomeric material can contain a copolyester elastomer and can serve as a sealing member.

13 Claims, 3 Drawing Sheets

(56) References Cited

U.S. PATENT DOCUMENTS

| | | |
|---|---|---|
| 6,414,155 B1 | 7/2002 | Sassi et al. |
| 9,156,959 B2 | 10/2015 | Kato et al. |
| 10,864,657 B2 | 12/2020 | de Weerd et al. |
| 10,913,846 B2 | 2/2021 | Lee |
| 2009/0043033 A1 | 2/2009 | Arpin |
| 2010/0275912 A1* | 11/2010 | Lulla ............... B65D 83/48 128/203.12 |
| 2018/0043656 A1 | 2/2018 | Song et al. |
| 2020/0371075 A1 | 11/2020 | Arigo et al. |

FOREIGN PATENT DOCUMENTS

| | | | | |
|---|---|---|---|---|
| CN | 104672809 A | 12/2013 | | |
| CN | 104672803 A | 6/2015 | | |
| CN | 106380800 A | 2/2017 | | |
| CN | 107814944 A | 3/2018 | | |
| CN | 108948688 A | 8/2018 | | |
| CN | 112011155 A | 12/2020 | | |
| CN | 112552658 A | 3/2021 | | |
| CN | 112759900 A | 5/2021 | | |
| CN | 109575535 B | 6/2021 | | |
| DE | 10138130 A1 * | 2/2003 | ............... | B05D 7/12 |
| DE | 102017131048 A1 | 6/2019 | | |
| EP | 1839836 A1 * | 10/2007 | ......... | B29C 45/1635 |
| EP | 3551502 B1 | 10/2019 | | |
| EP | 3845355 A1 | 7/2021 | | |
| JP | 4456392 B2 | 4/2010 | | |

OTHER PUBLICATIONS

PCT Search Report Corresponding to Application No. PCT/US2022/041850 on Nov. 15, 2022.

* cited by examiner

POLYESTER COMPOSITION AND ELASTOMER COATED ARTICLE MADE THEREWITH

RELATED APPLICATIONS

The present application is based upon and claims priority to U.S. Provisional Patent Application Ser. No. 63/238,296, having a filing date of Aug. 30, 2021, and which is incorporated herein by reference.

BACKGROUND

Engineering thermoplastics and elastomeric materials are often used in numerous and diverse applications in order to produce molded parts and products. For instance, polyester polymers and polyester elastomers are used to produce all different types of molded products, such as injection molded products, blow molded products, and the like. Polyester polymers, for instance, can be formulated in order to be chemically resistant, to have excellent strength properties and, when formulating compositions containing polyester elastomers, to be flexible. Of particular advantage, polyester polymers can be melt processed due to their thermoplastic nature. In addition, polyester polymers can be recycled and reprocessed.

Polyester polymers are particularly well suited to producing molded articles of any suitable shape or dimension. The molded articles can be made through injection molding, thermoforming, or any other suitable melt processing method. In many applications, the molded article is then bonded to adjacent materials when incorporated into a product or system. For example, many injection molded articles made from polyester polymers are overmolded with an elastomeric material. The elastomeric component, for instance, can be used to improve the sealing characteristics of the resulting product. Elastomeric materials can also have various other functional properties. For example, elastomeric materials can serve as anti-slip surfaces, as a sound dampening surface, as soft touch surface, or to provide a flexible surface.

Problems have been experienced in the past, however, in being able to produce a strong bond between a molded article made from a polyester polymer and an elastomeric material. In addition, when the resulting product is to be used in the medical field or in the food service industry, the use of chemical adhesives is generally not preferred or not permitted pursuant to various governmental regulations. Further, the presence of reinforcing fibers in the molded polyester article can further serve to hinder the formation of suitable bonding between the surface of the article and elastomeric material.

In view of the above, a need currently exists for a polyester polymer composition that has improved bond strength to elastomeric materials without the use of adhesives or tie layers, particularly in applications where the elastomeric material is overmolded onto an article made from the polyester polymer composition.

SUMMARY

In general, the present disclosure is directed to polyester polymer compositions containing a blend of polyester polymers that when molded into an article produce a surface that creates a dramatically improved bond strength with elastomeric materials, particularly copolyester elastomers. The polyester polymer composition can be formulated so as to contain a reduced amount of stabilizers that makes the composition well suited for use in medical applications and/or food handling applications. In fact, reducing the use or amount of various stabilizers has also been found to unexpectedly further increase the bond strength between the surface of the molded polyester article and an elastomeric material.

In one aspect, for instance, the present disclosure is directed to a polyester composition with improved adhesion to elastomeric materials comprising a mixture of a first polyester polymer and a second polyester polymer. The first polyester polymer can have a different crystallization rate than the second polyester polymer. For instance, the first polyester polymer can be a polybutylene terephthalate polymer while the second polyester polymer can be a polyethylene terephthalate polymer. The first polyester polymer can be present in the composition in an amount from about 30% by weight to about 75% by weight, such as in an amount from about 40% by weight to about 70% by weight. The second polyester polymer, on the other hand, can be present in the polymer composition in an amount from about 12% by weight to about 40% by weight, such as in an amount from about 18% by weight to about 35% by weight. Overall, the polymer composition can contain one or more polyester polymers in an amount of from about 50% by weight to about 90% by weight, such as in an amount from about 60% by weight to about 95% by weight.

The polyester composition can further contain reinforcing fibers. The reinforcing fibers can be present in the polymer composition generally in an amount from about 7% by weight to about 50% by weight, such as in an amount from about 12% by weight to about 30% by weight. The reinforcing fibers can comprise glass fibers.

In one aspect, the polyester composition can further contain a lubricant. The lubricant can be an amide. In one aspect, for instance, the lubricant comprises an ethylene bis stearamide. The lubricant can be present in the polymer composition in an amount from about 0.05% by weight to about 1.8% by weight.

In one aspect, the polyester composition is formulated so as to be free of particular types of stabilizers. The stabilizers can be removed from the composition in order to make the composition more amenable to particular applications, such as in the medical field. For example, in one embodiment, the polyester composition is free of hindered phenolic antioxidants. It was unexpectedly discovered that reducing or eliminating hindered phenolic antioxidants can actually increase adhesion of the polymer composition to elastomeric materials.

In another aspect, the polymer composition can be formulated so as to be free of certain phosphorus-containing stabilizers. For example, the composition can be formulated to be free of diphosphite stabilizers.

The present disclosure is also directed to a multi-component polymer article. The polymer article includes a polymer component and an elastomeric component. The polymer component comprises a mixture of a first polyester polymer and a second polyester polymer. The first polyester polymer has a different crystallization rate than the second polyester polymer. For example, the first polyester polymer can be a polybutylene terephthalate polymer while the second polyester polymer can be a polyethylene terephthalate polymer. The polymer component further comprises reinforcing fibers and a nucleating agent. The reinforcing fibers can be present in the polymer component in an amount from about 7% to about 50% by weight. The polymer component can be free of hindered phenolic antioxidants.

The multi-component polymer article further comprises an elastomeric component applied to a surface of the polymer component. The elastomeric component comprises an elastomeric polymer, such as a copolyester elastomer. The elastomeric polymer, for instance, can comprise a block copolymer of polybutylene terephthalate segments and polyether or dimerdiol segments. In another aspect, the elastomeric polymer comprises a thermoplastic copolyester elastomer comprising a thermoplastic ester ether elastomer. The copolyester elastomer can be present in the material in an amount greater than about 70% by weight, such as in an amount greater than about 80% by weight, such as in an amount greater than about 90% by weight. The polymer component and the material can display a peeling force of greater than about 50 N, such as greater than about 70 N. The above peeling force can be obtained without having to place an adhesive or any other type of tie layer between the material and the surface of the polymer component. In this regard, the material can be applied directly to the surface of the polymer component.

The polybutylene terephthalate contained in the polymer component, in one aspect, has a melt flow rate of greater than about 40 g/10 min and less than about 120 g/10 min. In one particular embodiment, the polymer component contains a polyethylene terephthalate polymer in an amount from about 25% to about 35% by weight. The polybutylene terephthalate polymer can be present in the polymer component in an amount from about 40% to about 60% by weight.

The multi-component polymer article can be used in numerous and diverse applications. For instance, the multi-component polymer article can be used in food service applications and/or in medical applications. In one aspect, the multi-component polymer article comprises a medical inhaler, a medical injector, or the like. In one embodiment, the article can be used as part of a valve system for a gas powered auto-injection device, where the elastomeric component serves as a sealing structure.

The present disclosure is also directed to a method for producing a multi-component polymer article. The method includes first injection molding a polymer component made from the polyester polymer composition as described above. The method further includes overmolding the polymer component with an elastomeric polymer. In one embodiment, the multi-component polymer article is produced through a two component injection molding process. During the process, the polymer component is first molded and then overmolded with the elastomeric material, while the polymer component is still at an elevated temperature but has sufficient rigidity to maintain its shape.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
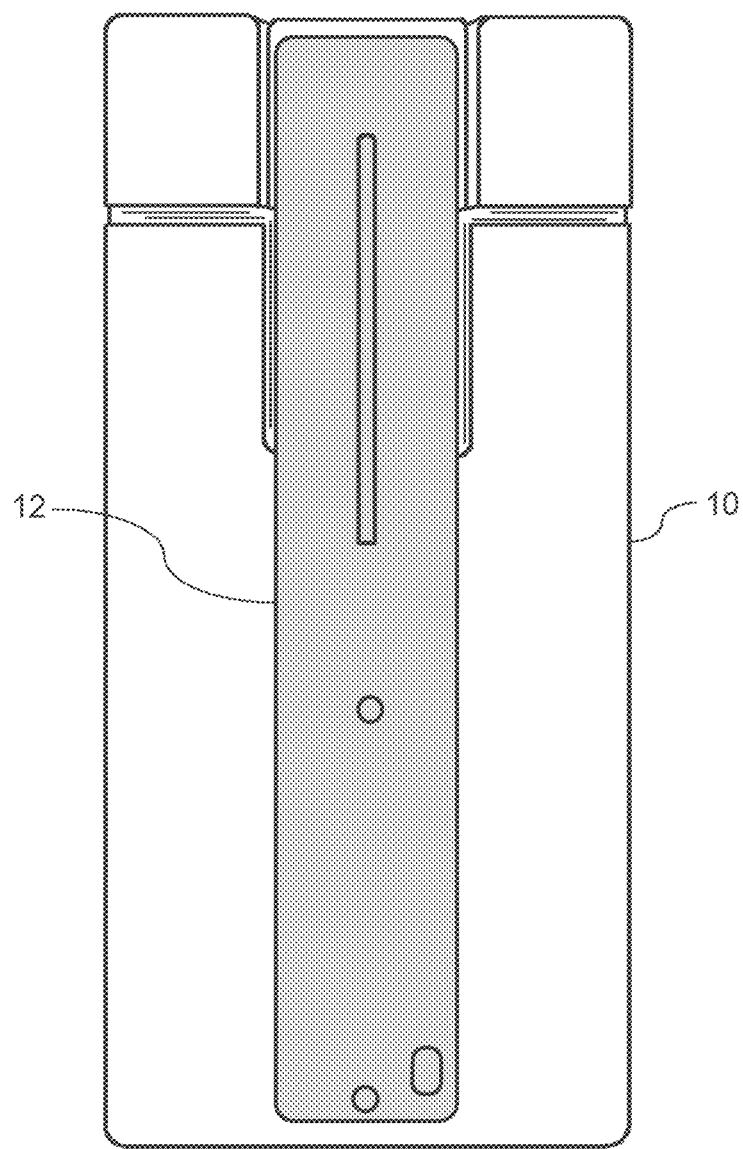
FIG. 1 is a plan view of the test specimen described in the examples below.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

The present disclosure is generally directed to a polyester polymer composition having excellent mechanical properties in combination with dramatically improved surface adhesion to other materials, particularly elastomeric polymers. In one aspect, the polyester composition can be formulated such that the composition meets all governmental regulations for use in medical applications and/or food handling applications. For example, the polyester polymer composition of the present disclosure, in one embodiment, can contain reduced levels or can be free from particular types of antioxidants and other stabilizers. Unexpectedly, it was discovered that reducing various different antioxidants and/or stabilizers can actually improve the adhesion properties between molded articles made from the polymer composition and an elastomeric material.

In order to improve the mechanical properties of the polyester polymer composition, the composition generally contains reinforcing fibers, such as glass fibers. Although glass fibers can improve various mechanical and physical properties of articles made from the composition, the glass fibers can also interfere with the bonding characteristics between a surface of the molded article and an elastomeric material. In this regard, the polyester polymer composition of the present disclosure contains a blend of polyester polymers that has been found to improve adhesion. For example, in one aspect, the polyester polymer composition can contain a polybutylene terephthalate polymer modified with amounts of a polyethylene terephthalate polymer. Adding the polyethylene terephthalate polymer in combination with the polybutylene terephthalate polymer has been found to further improve the adhesive characteristics of the surface of an article molded from the composition.

More particularly, the polymer composition of the present disclosure includes a combination of polyester polymers that represent the primary components of the composition. For instance, one or more polyester polymers are present in the polymer composition in an amount greater than about 50% by weight, such as in an amount greater than about 55% by weight, such as in an amount greater than about 60% by weight, such as in an amount greater than about 65% by weight, and generally in an amount less than about 88% by weight, such as in an amount less than about 85% by weight, such as in an amount less than about 82% by weight.

In one particular embodiment, the polymer composition contains a first polyester polymer that has a faster crystallization rate than a second polyester polymer. The first polyester polymer, for instance, may comprise a polybutylene terephthalate polymer while the second polymer may comprise a polyethylene terephthalate polymer. For example, the polybutylene terephthalate polymer may have a faster crystallization rate and may have an overall higher crystallinity than the polyethylene terephthalate polymer.

Combining a polyester polymer having a faster crystallization rate than a second polyester polymer may provide various advantages and benefits. For instance, using different polyester polymers can be used to produce an overall polymer composition having improved adhesion characteristics. The combination of polymers may also facilitate mixing with reinforcing fibers and/or provide various processing benefits.

The relative amounts of the first polyester polymer having the higher crystallinity (such as a polybutylene terephthalate polymer) and the second polyester polymer having the lower crystallinity (such as a polyethylene terephthalate polymer) can vary depending upon numerous factors including the end use application. In one embodiment, for instance, the first polyester polymer may be present in greater amounts than the second polyester polymer. For example, the weight ratio between the first polyester polymer and the second polyester polymer can be from about 1:1 to about 10:1, such as from about 1.25:1 to about 4:1, such as from about 1.5:1 to about 3:1.

In one aspect, the polymer composition can contain the first polyester polymer, such as one or more polybutylene terephthalate polymers, generally in an amount of from about 30% by weight to about 70% by weight, including all increments of 1% by weight therebetween. The composition can contain a single polybutylene terephthalate polymer or can include a plurality of different polybutylene terephthalate polymers having different characteristics. In one aspect, the polymer composition contains one or more polybutylene terephthalate polymers in an amount greater than about 30% by weight, such as in an amount greater than about 40% by weight, and generally in an amount less than about 75% by weight, such as in an amount less than about 70% by weight.

The polymer composition can contain the second polyester polymer, such as a polyethylene terephthalate polymer, generally in an amount greater than about 12% by weight, such as in an amount greater than about 15% by weight, such as in an amount greater than about 18% by weight, such as in an amount greater than about 23% by weight, such as in an amount greater than about 27% by weight. The second polyester polymer is generally present in an amount less than about 40% by weight, such as in an amount less than about 36% by weight, such as in an amount less than about 33% by weight.

In one embodiment, the polymer composition may contain reinforcing fibers. Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, or fibers from renewable resources.

The fibers may be in modified or unmodified form, e.g. provided with a sizing, or chemically treated, in order to improve adhesion to the plastic. Glass fibers are particularly preferred.

Glass fibers can be provided with a sizing to protect the glass fiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers, and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polymer matrix, for example in an extruder or kneader.

According to one embodiment, the polymer composition of the present disclosure comprises at least one reinforcing fiber which is a mineral fiber, preferably a glass fiber, more preferably a coated or impregnated glass fiber. Glass fibers which are suitable for the molding composition of the present disclosure are commercially available, e.g. Johns Manville, ThermoFlow® Chopped Strand 753, OCV Chopped Strand 408 A, Nippon Electric Glass Co. (NEG) Chopped Strand T-651.

Fiber diameters can vary depending upon the particular fiber used and whether the fiber is in either a chopped or a continuous form. The fibers, for instance, can have a diameter of from about 5 μm to about 100 μm, such as from about 5 μm to about 50 μm, such as from about 5 μm to about 15 μm. The length of the fibers can vary depending upon the particular application. For instance, the fibers can have an average length of greater than about 100 microns, such as greater than about 500 microns, such as greater than about 1,000 microns, such as greater than about 2,000 microns. The length of the fibers can generally be less than about 5,000 microns, such as less than about 4,500 microns, such as less than about 4,000 microns, such as less than about 3,500 microns.

Optionally, glass fibers are incorporated into the polymer composition that have a flat or ribbon-like shape. For example, the glass fibers can have a thickness to width ratio of greater than about 1:2, such as greater than about 1:4, such as greater than about 1:8, such as greater than about 1:12, and generally less than about 1:200, such as less than about 1:100.

Reinforcing fibers can be present in the polymer composition generally in an amount from about 5% to about 55% by weight, including all increments of 1% by weight therebetween. For example, reinforcing fibers, such as glass fibers, can be present in the polymer composition in an amount greater than about 10% by weight, such as in an amount greater than about 15% by weight, such as in an amount greater than about 18% by weight. The reinforcing fibers are generally present in an amount less than about 50% by weight, such as in an amount less than about 40% by weight, such as in an amount less than about 35% by weight, such as in an amount less than about 33% by weight.

The polymer composition may also contain one or more lubricants. Amide waxes, for instance, may be employed that are formed by reaction of a fatty acid with a monoamine or diamine (e.g., ethylenediamine) having 2 to 18, especially 2 to 8, carbon atoms. For example, ethylenebisamide wax, which is formed by the amidization reaction of ethylene diamine and a fatty acid, may be employed. The fatty acid may be in the range from $C_{12}$ to $C_{30}$, such as from stearic acid ($C_{18}$ fatty acid) to form ethylenebisstearamide wax. In one aspect, the ethylenebisstearamide wax has a discrete melt temperature of 142° C. Other ethylenebisamides include the bisamides formed from lauric acid, palmitic acid, oleic acid, linoleic acid, linolenic acid, oleostearic acid, myristic acid and undecalinic acid. Still other suitable amide waxes are N-(2-hydroxyethyl)12-hydroxystearamide and N,N'-(ethylene bis)12-hydroxystearamide.

In one aspect, the polyester polymer composition of the present disclosure can be formulated so as to be free of many conventionally used lubricants and mold release agents. For instance, the polymer composition can be formulated to be free of certain fatty acid esters, particularly fatty acid esters having relatively long carbon chains. In one particular embodiment, for instance, the composition of the present disclosure is free from any fatty acid esters that are derived from montanic acids, such as esters of a montanic acid in combination with a polyol. The composition, for example, can be free of a mixture of montanic acid esters and calcium montanate.

One or more lubricants can be present in the polymer composition generally in an amount greater than about 0.05% by weight, such as in an amount greater than about 0.1% by weight, such as in an amount greater than about 0.2% by weight, such as in an amount greater than about 0.25% by weight. One or more lubricants are generally present in an amount less than about 2% by weight, such as in an amount less than about 1.8% by weight, such as in an amount less than about 0.9% by weight.

The polymer composition of the present disclosure can contain various other additives. The different additives and other components incorporated into the polymer composition, for instance, can provide one or more benefits while also maintaining the composition suitable for use in medical applications and food service-related applications. Consequently, the additives can be medical-grade additives that do not interfere with the adhesive properties of the polymer composition.

In certain applications, some additives are intentionally avoided for use in the polymer composition of the present disclosure. For example, the polymer composition can optionally be free of specific antioxidants that were commonly used in the past. For example, in one embodiment, the polyester polymer composition of the present disclosure is free of hindered phenolic antioxidants or contains such antioxidants in very limited amounts. For example, the polymer composition can be formulated to contain hindered phenolic antioxidants in an amount less than about 0.1% by weight, such as in an amount less than about 0.05% by weight, such as in an amount less than about 0.03% by weight, such as in an amount of 0% by weight.

Examples of such phenolic antioxidants include, for instance, calcium bis(ethyl 3,5-di-tert-butyl-4-hydroxybenzylphosphonate) (Irganox® 1425); terephthalic acid, 1,4-dithio-,S,S-bis(4-tert-butyl-3-hydroxy-2,6-dimethylbenzyl) ester (Cyanox® 1729); triethylene glycol bis(3-tert-butyl-4-hydroxy-5-methylhydrocinnamate); hexamethylene bis(3,5-di-tert-butyl-4-hydroxyhydrocinnamate (Irganox® 259); 1,2-bis(3,5,di-tert-butyl-4-hydroxyhydrocinnamoyl)hydrazide (Irganox® 1024); 4,4'-di-tert-octyldiphenamine (Naugalube® 438R); phosphonic acid, (3,5-di-tert-butyl-4-hydroxybenzyl)-,dioctadecyl ester (Irganox® 1093); 1,3,5-trimethyl-2,4,6-tris(3',5'-di-tert-butyl-4' hydroxybenzyl) benzene (Irganox® 1330); 2,4-bis(octylthio)-6-(4-hydroxy-3,5-di-tert-butylanilino)-1,3,5-triazine (Irganox® 565); isooctyl 3-(3,5-di-tert-butyl-4-hydroxyphenyl)propionate (Irganox® 1135); octadecyl 3-(3,5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol)monoacrylate (Irganox® 3052); 2-tert-butyl-6-[1-(3-tert-butyl-2-hydroxy-5-methylphenyl)ethyl]-4-methylphenyl acrylate (Sumilizer® TM 4039); 2-[1-(2-hydroxy-3,5-di-tert-pentylphenyl)ethyl]-4,6-6-tert-pentylphenyl acrylate (Sumilizer® GS); 1,3-dihydro-2H-Benzimidazole (Sumilizer® MB); 2-methyl-4,6-bis[(octylthio)methyl]phenol (Irganox® 1520); N,N'-trimethylenebis-[3-(3,5-di-tert-butyl-4-hydroxyphenyl)propionamide (Irganox® 1019); 4-n-octadecyloxy-2,6-diphenylphenol (Irganox® 1063); 2,2'-ethylidenebis[4,6-6-tert-butylphenol] (Irganox® 129); N N'-hexamethylenebis(3,5-di-tert-butyl-4-hydroxyhydrocinnamamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1-napthalenamine (Irganox® L 05); tris[2-tert-butyl-4-(3-tert-butyl-4-hydroxy-6-methylphenylthio)-5-methyl phenyl] phosphite (Hostanox® OSP 1); zinc dinonyidithiocarbamate (Hostanox® VP-ZNCS 1); 3,9-bis[1,1-diimethyl-2-[(3-tert-butyl-4-hydroxy-5-methylphenyl)propionyloxy]ethyl]-2,4,8,10-tetraoxaspiro[5.5]undecane (Sumilizer® AG80); pentaerythrityl tetrakis[3-(3,5-di-tert-butyl-4-hydroxyphenyl) propionate](Irganox® 1010); ethylene-bis(oxyethylene)bis [3-(5-tert-butyl-4-hydroxy-m-tolyl)-propionate (Irganox® 245); 3,5-di-tert-butyl-4-hydroxytoluene (Lowinox BHT, Chemtura) and the like.

It was unexpectedly discovered that reducing or eliminating the use of hindered phenolic antioxidants actually increases the bond strength between a molded article made from the polyester composition and an elastomeric material, particularly an elastomeric material formed from a copolyester elastomer. Although unknown, it is believed that hindered phenolic antioxidants may prevent ester interchange at the boundary layer between the molded article and the elastomeric material.

In addition to being free of phenolic antioxidants, the polymer composition of the present disclosure can also be formulated to be free of diphosphite stabilizers.

One type of stabilizer that may be included in the polyester composition are hindered amine light stabilizers ("HALS"). Suitable HALS compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. Regardless of the compound from which it is derived, the hindered amine is typically an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit.

Without intending to be limited by theory, it is believed that high molecular weight hindered amines are relatively thermostable and thus able to inhibit light degradation even after being subjected to extrusion conditions. One particularly suitable high molecular weight hindered amine has the following general structure:

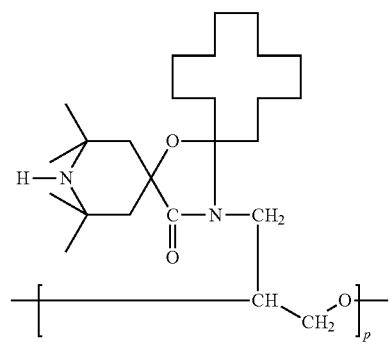

wherein, p is 4 to 30, in some embodiments 4 to 20, and in some embodiments 4 to 10. This oligomeric compound is commercially available from Clariant under the designation Hostavin® N30 and has a number average molecular weight of 1200.

Another suitable high molecular weight hindered amine has the following structure:

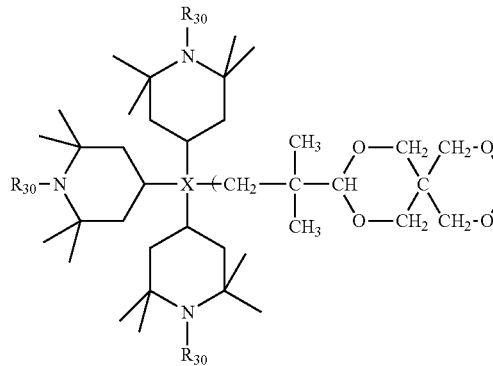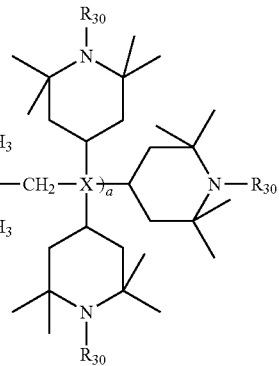

wherein, n is from 1 to 4 and $R_{30}$ is independently hydrogen or $CH_3$. Such oligomeric compounds are commercially available from Adeka Palmarole SAS (joint venture between Adeka Corp. and Palmarole Group) under the designation ADK STAB® LA-63 ($R_{30}$ is $CH_3$) and ADK STAB® LA-68 ($R_{30}$ is hydrogen).

Other examples of suitable high molecular weight hindered amines include, for instance, an oligomer of N-(2-hydroxyethyl)-2,2,6,6-tetramethyl-4-piperidinol and succinic acid (Tinuvin® 622 from Ciba Specialty Chemicals, MW=4000); oligomer of cyanuric acid and N,N-di(2,2,6,6-tetramethyl-4-piperidyl)-hexamethylene diamine; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346 from Cytec, MW=1600); polymethylpropyl-3-oxy-[4(2,2,6,6-tetramethyl)-piperidinyl]siloxane (Uvasil® 299 from Great Lakes Chemical, MW=1100 to 2500); copolymer of α-methylstyrene-N-(2,2,6,6-tetramethyl-4-piperidinyl)maleimide and N-stearyl maleimide; 2,4,8,10-tetraoxaspiro[5.5]undecane-3,9-diethanol tetramethyl-polymer with 1,2,3,4-butanetetracarboxylic acid; and so forth. Still other suitable high molecular weight hindered amines are described in U.S. Pat. No. 5,679,733 to Malik, et al. and U.S. Pat. No. 6,414,155 to Sassi, et al., which are incorporated herein in their entirety by reference thereto for all purposes.

In addition to the high molecular hindered amines, low molecular weight hindered amines may also be employed in the composition. Such hindered amines are generally monomeric in nature and have a molecular weight of about 1000 or less, in some embodiments from about 155 to about 800, and in some embodiments, from about 300 to about 800.

Specific examples of such low molecular weight hindered amines may include, for instance, bis-(2,2,6,6-tetramethyl-4-piperidyl) sebacate (Tinuvin® 770 from Ciba Specialty Chemicals, MW=481); bis-(1,2,2,6,6-pentamethyl-4-piperidinyl)-(3,5-ditert.butyl-4-hydroxybenzyl)butyl-propane dioate; bis-(1,2,2,6,6-pentamethyl-4-piperidinyl)sebacate; 8-acetyl-3-dodecyl-7,7,9,9-tetramethyl-1,3,8-triazaspiro(4,5)-decane-2,4-dione, butanedioic acid-bis-(2,2,6,6-tetramethyl-4-piperidinyl) ester; tetrakis-(2,2,6,6-tetramethyl-4-piperidyl)-1,2,3,4-butane tetracarboxylate; 7-oxa-3,20-diazadispiro(5.1.11.2) heneicosan-20-propanoic acid, 2,2,4,4-tetramethyl-21-oxo, dodecyl ester; N-(2,2,6,6-tetramethyl-4-piperidinyl)-N'-amino-oxamide; o-t-amyl-o-(1,2,2,6,6-pentamethyl-4-piperidinyl)-monoperoxicarbonate; β-alanine, N-(2,2,6,6-tetramethyl-4-piperidinyl), dodecylester; ethanediamide, N-(1-acetyl-2,2,6,6-tetramethylpiperidinyl)-N'-dodecyl; 3-dodecyl-1-(2,2,6,6-tetramethyl-4-piperidinyl)-pyrrolidin-2,5-dione; 3-dodecyl-1-(1,2,2,6,6-pentamethyl-4-piperidinyl)-pyrrolidin-2,5-dione; 3-dodecyl-1-(1-acetyl,2,2,6,6-tetramethyl-4-piperidinyl)-pyrrolidin-2,5-dione, (Sanduvar® 3058 from Clariant, MW=448.7); 4-benzoyloxy-2,2,6,6-tetramethylpiperidine; 1-[2-(3,5-di-tert-butyl-4-hydroxyphenylpropionyloxy) ethyl]-4-(3,5-di-tert-butyl-4-hydroxylphenyl propionyloxy)-2,2,6,6-tetramethyl-piperidine; 2-methyl-2-(2",2",6",6"-tetramethyl-4"-piperidinylamino)-N-(2',2',6',6'-tetra-methyl-4'-piperidinyl)propionylamide; 1,2-bis-(3,3,5,5-tetramethyl-2-oxo-piperazinyl)ethane, 4-oleoyloxy-2,2,6,6-tetramethylpiperidine; and combinations thereof. Other suitable low molecular weight hindered amines are described in U.S. Pat. No. 5,679,733 to Malik, et al.

The hindered amines may be employed singularly or in combination in any amount to achieve the desired properties, but typically constitute from about 0.01 wt. % to about 4 wt. % of the polymer composition.

UV absorbers, such as benzotriazoles or benzopheones, may be employed in the composition to absorb ultraviolet light energy. Suitable benzotriazoles may include, for instance, 2-(2-hydroxyphenyl)benzotriazoles, such as 2-(2-hydroxy-5-methylphenyl)benzotriazole; 2-(2-hydroxy-5-tert-octylphenyl)benzotriazole (Cyasorb® UV 5411 from Cytec); 2-(2-hydroxy-3,5-di-tert-butylphenyl)-5-chlorobenzo-triazole; 2-(2-hydroxy-3-tert-butyl-5-methylphenyl)-5-chlorobenzotriazole; 2-(2-hydroxy-3,5-dicumylphenyl)benzotriazole; 2,2'-methylenebis(4-tert-octyl-6-benzotriazolylphenol); polyethylene glycol ester of 2-(2-hydroxy-3-tert-butyl-5-carboxyphenyl)benzotriazole; 2-[2-hydroxy-3-(2-acryloyloxyethyl)-5-methylphenyl]-benzotriazole; 2-[2-hydroxy-3-(2-methacryloyloxyethyl)-5-tert-butylphenyl]benzotriazole; 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole; 2-[2-hydroxy-5-(2-methacryloyloxyethyl)phenyl]benzotriazole; 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5- chlorobenzotriazole; 2-[2-hydroxy-4-(2-methacryloyloxymethyl)phenyl]benzotriazole; 2-[2-hydroxy-4-(3-methacryloyloxy-2-hydroxypropyl)phenyl]benzotriazole; 2-[2-hydroxy-4-(3-methacryloyloxypropyl)phenyl]benzotriazole; and combinations thereof.

Exemplary benzophenone light stabilizers may likewise include 2-hydroxy-4-dodecyloxybenzophenone; 2,4-dihydroxybenzophenone; 2-(4-benzoyl-3-hydroxyphenoxy) ethyl acrylate (Cyasorb® UV 209 from Cytec); 2-hydroxy-4-n-octyloxy)benzophenone (Cyasorb® 531 from Cytec); 2,2'-dihydroxy-4-(octyloxy)benzophenone (Cyasorb® UV 314 from Cytec); hexadecyl-3,5-bis-tert-butyl-4-hydroxybenzoate (Cyasorb® UV 2908 from Cytec); 2,2'-thiobis(4-tert-octylphenolato)-n-butylamine nickel(II) (Cyasorb® UV 1084 from Cytec); 3,5-di-tert-butyl-4-hydroxybenzoic acid, (2,4-di-tert-butylphenyl)ester (Cyasorb® 712 from Cytec); 4,4'-dimethoxy-2,2'-dihydroxybenzophenone (Cyasorb® UV 12 from Cytec); and combinations thereof.

When employed, UV absorbers may constitute from about 0.01 wt. % to about 4 wt. % of the entire polymer composition.

Once formed, the polymer composition may be molded into a shaped part for use in a wide variety of different applications. For example, the shaped part may be molded using an injection molding process in which dried and preheated plastic granules are injected into the mold. It should be understood that in addition to injection molded articles, the polymer composition of the present disclosure can be fed through any suitable molding process to produce a shaped article. Such molding processes include extrusion, blow molding, thermoforming, and the like.

Once a polymer component is formed from the polyester polymer composition of the present disclosure, an elastomeric material is applied to a surface of the component for producing an elastomeric component bonded to the polymer component. The elastomeric material applied to the polymer component can be made primarily from any suitable elastomeric polymer. One or more elastomeric polymers can be contained in the coating in an amount greater than about 80% by weight, such as in an amount greater than about 90% by weight. The elastomeric material can be made from any suitable elastomeric polymer. Elastomeric polymers that can be used to produce the coating include thermoplastic polyurethane elastomers, silicone elastomers, and the like.

In one embodiment, the elastomeric component is formed from a copolyester elastomer. For example, in one embodiment, the elastomeric material may contain a segmented thermoplastic copolyester. The thermoplastic polyester elastomer, for example, may comprise a multi-block copolymer. Useful segmented thermoplastic copolyester elastomers include a multiplicity of recurring long chain ester units and short chain ester units joined head to tail through ester linkages. The long chain units can be represented by the formula

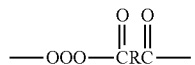

and the short chain units can be represented by the formula

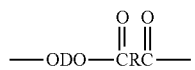

where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 15 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600, such as from about 600-6000, a melting point less than about 55° C. and a carbon to oxygen ratio about 2.0 or greater. The long chain glycols are generally poly(alkylene oxide) glycols or glycol esters of poly(alkylene oxide) dicarboxylic acids. Any substituent groups can be present which do not interfere with polymerization of the compound with glycol(s) or dicarboxylic acid(s), as the case may be. The hydroxy functional groups of the long chain glycols which react to form the copolyesters can be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The dicarboxylic acids may include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers for the elastomer have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralenedicarboxylic acid, anthralenedicarboxylic acid, 4,4'-sulfonyl dibenzoic acid, etc. and $C_1$-$C_{10}$ alkyl and other ring substitution derivatives thereof such as halo, alkoxy or aryl derivatives. Hydroxy acids such as p(β-hydroxyethoxy) benzoic acid can also be used providing an aromatic dicarboxylic acid is also present.

Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylenedicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate.

The dicarboxylic acid may have a molecular weight less than about 300. In one embodiment, phenylene dicarboxylic acids are used such as terephthalic and isophthalic acid.

Included among the low molecular weight (less than about 250) diols which react to form short chain ester units of the copolyesters are acyclic, alicyclic and aromatic dihydroxy compounds. Included are dials with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Also included are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). Low molecular weight diols also include such equivalent ester-forming derivatives.

Long chain glycols which can be used in preparing the polymers include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide HOOCCH$_2$(OCH$_2$CH$_2$CH$_2$CH$_2$)$_x$OCH$_2$COOH  IV can be used to form long chain glycols in situ. Polythioether glycols and polyester glycols also provide useful products. In using polyester glycols, care must generally be exercised to control a tendency to interchange during melt polymerization, but certain sterically hindered polyesters, e.g., poly(2,2-dimethyl-1,3-propylene adipate), poly(2,2-dimethyl-1, 3-propylene/2-methyl-2-ethyl-1,3-propylene 2,5-dimethylterephthalate), poly(2,2-dimethyl-1,3-propylene/2, 2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylenediene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure

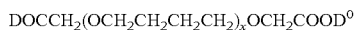

when only one low molecular weight diol (corresponding to D) is employed. When more than one diol is used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight diol is present in considerable molar excess.

In place of a single low molecular weight diol, a mixture of such dials can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

Copolyether esters with alternating, random-length sequences of either long chain or short chain oxyalkylene glycols can contain repeating high melting blocks that are capable of crystallization and substantially amorphous blocks with a relatively low glass transition temperature. In one embodiment, the hard segments can be composed of tetramethylene terephthalate units and the soft segments may be derived from aliphatic polyether and polyester glycols. Of particular advantage, the above materials resist deformation at surface temperatures because of the presence of a network of microcrystallites formed by partial crystallization of the hard segments. The ratio of hard to soft segments determines the characteristics of the material. Thus, another advantage to thermoplastic polyester elastomers is that soft elastomers and hard elastoplastics can be produced by changing the ratio of the hard and soft segments.

In one particular embodiment, the polyester thermoplastic elastomer has the following formula: -[4GT]$_x$[BT]$_y$, wherein 4G is butylene glycol, such as 1,4-butane diol, B is poly(tetramethylene ether glycol) and T is terephthalate, and wherein x is from about 0.60 to about 0.99 and y is from about 0.01 to about 0.40.

In one aspect, the thermoplastic polyester elastomer can be a block copolymer of polybutylene terephthalate and polyether segments and/or dimerdiol segments and can have a structure as follows:

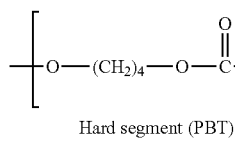

Hard segment (PBT)

Soft Segment (Polytetramethylene Ether Glycol Terephtalate)

wherein a and b are integers and can vary from 2 to 50,000, such as from about 2 to about 10,000. The ratio between hard and soft segments in the block copolymer as described above can be varied in order to vary the properties of the elastomer.

In one aspect, the elastomeric material can contain a copolyester elastomer comprising a block copolymer containing polybutylene terephthalate segments and polytetramethylene ether glycol terephthalate segments.

In one aspect, the density of the polyester elastomer as indicated above can be from about 1.05 $g/cm^3$ to about 1.15 $g/cm^3$, such as from about 1.08 $g/cm^3$ to about 1.2 $g/cm^3$.

In one aspect, the copolyester elastomer can have a Shore D hardness of less than about 100, such as less than about 90, such as less than about 80, such as less than about 70, such as less than about 60, such as less than about 50, such as less than about 40. The Shore D hardness of the elastomer can generally be greater than about 10, such as greater than about 15, such as greater than about 20, such as greater than about 25.

The elastomeric material can be applied to the polymer component made from the polyester composition using any suitable method or technique. In one embodiment, for instance, the elastomeric material is overmolded onto the surface of the polymer component to form the elastomeric component. For example, the polymer component can first be injection molded and prior to cooling, can be overmolded with the elastomeric material also using an injection molding process.

In accordance with the present disclosure, a significant bond forms between the elastomeric component and the surface of the polymer component without the use of an adhesive or any intervening tie layer. The bond strength between the elastomeric material and the surface of the polymer component, for instance, can display a peeling force of greater than about 50 N, such as greater than about 55 N, such as greater than about 60 N, such as greater than about 65 N, such as greater than about 70 N, and generally less than about 200 N.

All different types of products can be made according to the present disclosure. For instance, multi-component articles made according to the present disclosure are particularly well suited for use in the medical field to produce various different types of medical products. The medical product, for instance, can be an inhaler, an injector, or the like. In one embodiment, for instance, the multi-component polymer article can be used to produce a component of a valve in a gas-assisted injection device. The elastomeric component can form a sealing member on the polymer component. The elastomeric component, for example can serve as a sealing ring or O-ring.

Figure 2:
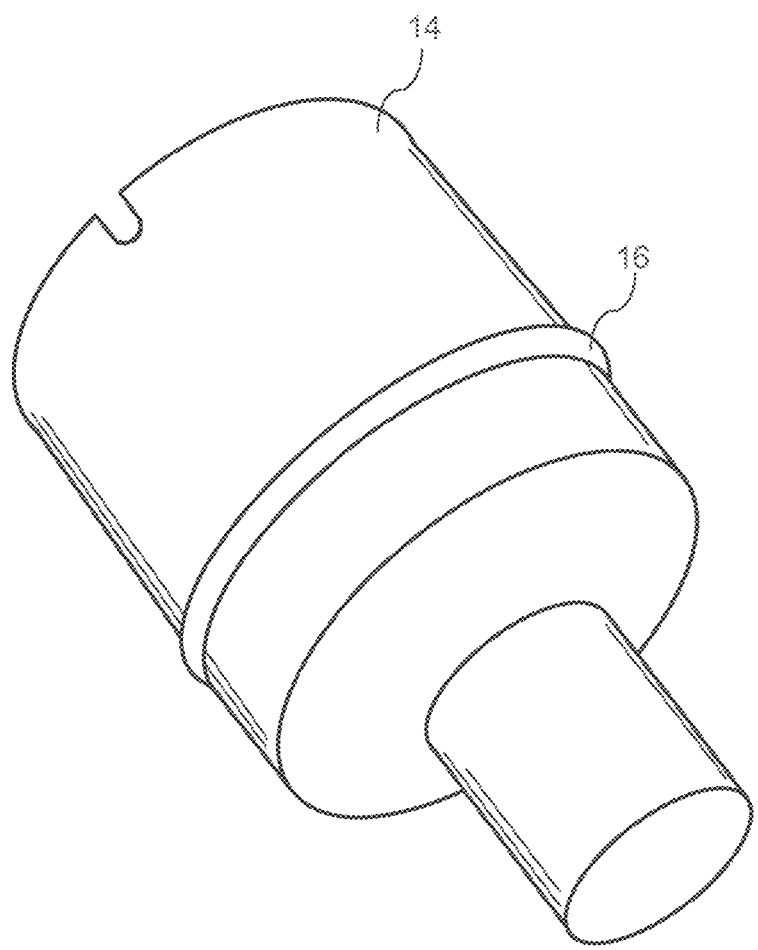
FIG. 2 is a perspective view of a multi-component article made in accordance with the present disclosure.

For example, referring to FIG. 2, a multicomponent article made in accordance with the present disclosure is shown. The article includes a polymer component 14 made from a polyester composition as described above. The polymer component 14 is bonded to an elastomeric component 16 which is in the shape of a ring. The elastomeric component 16, in this embodiment, serves as a sealing member for sealing against fluids, such as gasses and liquids.

Figure 3:
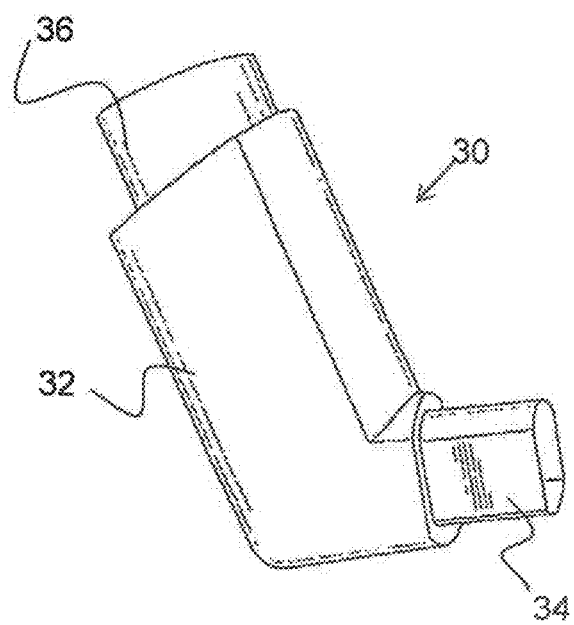
FIG. 3 illustrates one embodiment of a medical apparatus comprising a composition prepared according to the present disclosure.

The multicomponent article can be incorporated in all different types of devices. For example, referring to FIG. 3, an inhaler 30 is shown that may incorporate the multicomponent article. The inhaler 30 includes a housing 32 attached to a mouthpiece 34. In operative association with the housing 32 is a plunger 36 for receiving a canister containing a composition to be inhaled. Not shown, the plunger may include an elastomeric component in accordance with the present disclosure. The composition may comprise a spray or a powder.

During use, the inhaler 30 administers metered doses of a medication, such as an asthma medication to a patient. The asthma medication may be suspended or dissolved in a propellant or may be contained in a powder. When a patient actuates the inhaler to breathe in the medication, a valve opens allowing the medication to exit the mouthpiece. In accordance with the present disclosure, the elastomeric component on the plunger 36 can form a seal against a housing in order to better dispense controlled amounts of the composition.

Figure 4:
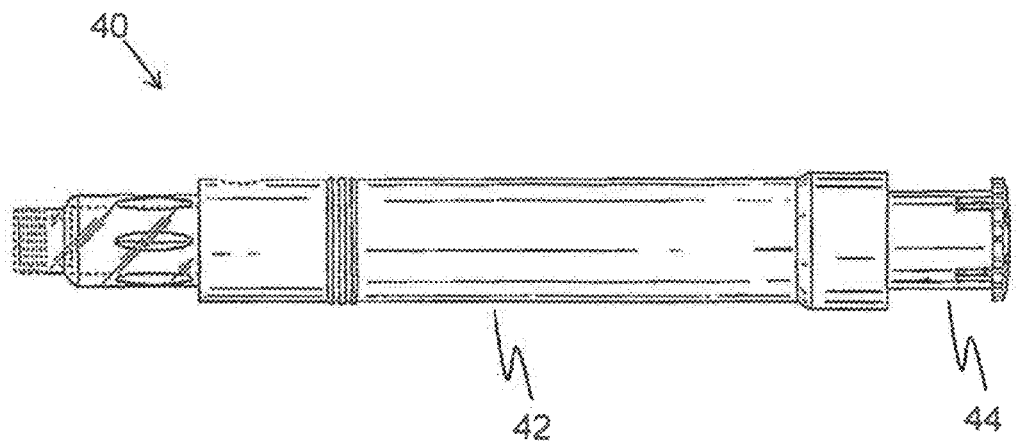
FIG. 4 illustrates another embodiment of a medical apparatus comprising a composition prepared according to the present disclosure.

Referring to FIG. 4, another medical product that may be made in accordance with the present disclosure is shown. In FIG. 4, a medical injector 40 is illustrated. The medical injector 40 includes a housing 42 in operative association with a plunger 44. The housing 42 may slide relative to the plunger 44. The medical injector 40 may be spring loaded. The medical injector is for injecting a drug into a patient typically into the thigh or the buttocks. The medical injector can be needleless or may contain a needle. When containing a needle, the needle tip is typically shielded within the housing prior to injection. Needleless injectors, on the other hand, can contain a cylinder of pressurized gas that propels a medication through the skin without the use of a needle. In accordance with the present disclosure, the plunger 44 can be include a sealing member and be made from the multi-component article of the present disclosure.

The present disclosure may be better understood with reference to the following examples.

Example

Three different polyester polymer compositions were formulated and tested for various physical properties. In addition, the polymer compositions were injection molded and then overmolded with a strip of a copolyester elastomer in order to measure for peel strength.

More particularly, the following polymer compositions were formulated:

| Component | Sample No. 1 | Sample No 2 | Sample No. 3 |
|---|---|---|---|
| Polybutylene terephthalate (38 $cm^3$/10 min) | 59.35 | | |
| Polybutylene terephthalate (62 $cm^3$/10 min) | | 59.55 | 49.40 |
| Polyethylene terephthalate (IV of 0.76 dl/g | 20.00 | 20.00 | 30.00 |

-continued

| Component | Sample No. 1 | Sample No 2 | Sample No. 3 |
|---|---|---|---|
| Glass fibers | 20.00 | 20.00 | 20.00 |
| Talc-nucleating agent | 0.15 | 0.15 | 0 30 |
| Pentaerythritol tetrakis[3-[3,5-di-tert-butyl-4-hydroxyphenyl]propionate antioxidant | 0.08 | | |
| Bis-(2,4-di-tert-butyl-phenol) pentaerythritol diphosphite stabilizer | 0.17 | | |
| Esters of montanic acid | 0.25 | | |
| Ethylene bis stearamide | | 0.30 | 0.30 |

The above polymer compositions were tested for various physical properties and the following results were obtained:

| Test | Unit | Method | Sample No. 1 | Sample No. 2 | Sample No. 3 |
|---|---|---|---|---|---|
| MVR | cm$^3$/10 min | 265 C., 2.16 kg | 19 | 22 | 21 |
| Tensile Modulus | MPa | ISO527-2/1A | 7470 | 7720 | 7740 |
| Tensile strength at break, 5 mm/min | MPa | ISO527-2/1A | 132 | 134 | 138 |
| Elongation at break, 5 mm/min | % | ISO527-2/1A | 3.4 | 2.7 | 2.8 |
| Charpy unnotched impact strength 23 C. | KJ/m$^2$ | ISO179/1eU | 41 | 40 | 42 |
| Charpy notched impact strength 23 C. | KJ/m$^2$ | ISO179/1eA | 8 | 8 | 8 |

The polymer compositions described above were injection molded and then overmolded with a strip made from a copolyester elastomer. The test specimen is shown is FIG. 1. As shown in FIG. 1, the polymer component 10 is adhered to the elastomeric strip 12. The elastomeric strip had a width of 29.3 mm.

The peeling speed was 100 mm/min. using a Zwick Telfort Tensile System with clamps to conduct the peel test. The peel test was done according to ISO 4578/DIN EN 1464.

For each polymer composition, two different copolyester elastomers were bonded to the polyester polymer component and tested for peel strength. The copolyester elastomers used were block copolymers containing polybutylene terephthalate segments and dimerdiol segments. The first elastomer had a Shore D hardness of 25 while the second copolyester elastomer had a Shore D hardness of 35. The following results were obtained:

| | | Sample No. 1 | Sample No. 2 | Sample No. 3 |
|---|---|---|---|---|
| Copolyester elastomer having a Shore D hardness of 25 | | | | |
| Peeling Force | N | 43.2 | 130.3 | 272 |
| Soft component width | mm | 29.3 | 29.3 | 29.3 |
| Peel Strength | N/mm | 1.48 | 4.45 | 9.32 |
| Copolyester elastomer having a Shore D hardness of 35 | | | | |
| Peeling Force | N | 31.5 | 79.6 | 146 |
| Soft component width | mm | 29.3 | 29.3 | 29.3 |
| Peel Strength | N/mm | 1.08 | 2.72 | 4.98 |

As shown above, Sample Nos. 2 and 3 displayed dramatically better peel strength than Sample No. 1.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A multi-component polymer article comprising:
    a polymer component comprising a mixture of a first polyester polymer and a second polyester polymer, the first polyester polymer having a different crystallization rate than the second polyester polymer, the polymer component further comprising reinforcing fibers and a nucleating agent, the reinforcing fibers being present in the polymer component in an amount from 7% to 50% by weight, the polymer component being free of hindered phenolic antioxidants; and
    an elastomeric component applied directly to a surface of the polymer component, the elastomeric component having a density from 1.05 g/cm$^3$ to 1.2 g/cm$^3$.

2. A multi-component polymer article as defined in claim 1, wherein the elastomeric component comprises a copolyester.

3. A multi-component polymer article as defined in claim 1, wherein the elastomeric component comprises a thermoplastic copolyester elastomer comprising a block copolymer of polybutylene terephthalate and polyether or dimerdiol segments.

4. A multi-component polymer article as defined in claim 1, wherein the elastomeric component comprises a thermoplastic copolyester elastomer comprising a thermoplastic ester ether elastomer.

5. A multi-component polymer article as defined in claim 1, wherein elastomer component comprises a thermoplastic copolyester elastomer in an amount greater than 70% by weight.

6. A multi-component polymer article as defined in claim 1, wherein the polymer component and elastomeric component display a peeling force of greater than about 50 N.

7. A multi-component polymer article as defined in claim 1, wherein the first polyester polymer comprises a polybutylene terephthalate polymer.

8. A multi-component polymer article as defined in claim 7, wherein the second polyester polymer comprises a polyethylene terephthalate polymer.

9. A multi-component polymer article as defined in claim 7, wherein the polybutylene terephthalate polymer has a melt flow rate of greater than 40 g/10 min. and less than 120 g/10 min.

10. A multi-component polymer article as defined in claim 8, wherein the polyethylene terephthalate polymer is present in the polymer component in an amount from 25% by weight to 35% by weight and wherein the polybutylene terephthalate polymer is present in the polymer component in an amount from 40% by weight to 60% by weight.

11. A multi-component polymer article as defined in claim 1, wherein the multi-component polymer article comprises a medical device.

12. A multi-component polymer article as defined in claim 1, wherein the multi-component polymer article comprises a medical inhaler or medical injector.

13. A multi-component polymer article as defined in claim 1, wherein the elastomeric component forms a sealing member on the polymer component.

* * * * *